United States Patent
Buddharaju et al.

(10) Patent No.: US 12,038,297 B2
(45) Date of Patent: Jul. 16, 2024

(54) REMOTE CONTROL OF VEHICLE VIA SMARTPHONE AND GESTURE INPUT

(71) Applicant: Toyota Motor Engineering & Manufacturing North America, Inc., Plano, TX (US)

(72) Inventors: Krishna V. Buddharaju, Northville, MI (US); Ming Michael Meng, Novi, MI (US)

(73) Assignee: TOYOTA MOTOR ENGINEERING & MANUFACTURING NORTH AMERICA, INC., Plano, TX (US)

( * ) Notice: Subject to any disclaimer, the term of this patent is extended or adjusted under 35 U.S.C. 154(b) by 419 days.

(21) Appl. No.: 16/831,591

(22) Filed: Mar. 26, 2020

(65) Prior Publication Data

US 2021/0302189 A1    Sep. 30, 2021

(51) Int. Cl.
| | |
|---|---|
| *G01C 21/36* | (2006.01) |
| *G05D 1/00* | (2006.01) |
| *G06F 3/01* | (2006.01) |
| *G06F 3/04815* | (2022.01) |
| *G06F 3/04817* | (2022.01) |
| *G06V 20/58* | (2022.01) |
| *H04W 4/02* | (2018.01) |

(52) U.S. Cl.
CPC ....... *G01C 21/362* (2013.01); *G01C 21/3664* (2013.01); *G05D 1/0016* (2013.01); *G05D 1/0022* (2013.01); *G06F 3/017* (2013.01); *G06F 3/04815* (2013.01); *G06F 3/04817* (2013.01); *G06V 20/58* (2022.01); *H04W 4/026* (2013.01)

(58) Field of Classification Search
USPC .......................................................... 701/2
See application file for complete search history.

(56) References Cited

U.S. PATENT DOCUMENTS

| | | |
|---|---|---|
| 8,234,059 B2 | 7/2012 | Sugiyama et al. |
| 8,856,671 B2 | 10/2014 | Halbherr et al. |
| 9,586,682 B2 | 3/2017 | Kim et al. |
| 9,669,783 B2 | 6/2017 | Kim et al. |
| 10,041,804 B2 | 8/2018 | Solomon et al. |
| 10,223,916 B2 | 3/2019 | Song et al. |
| 10,366,602 B2 | 7/2019 | O'Shea et al. |
| 10,372,132 B2 | 8/2019 | Herz et al. |
| 10,507,917 B2 | 12/2019 | Taylor et al. |
| 10,509,410 B2 | 12/2019 | Hammond et al. |
| 10,969,949 B2 * | 4/2021 | Teshima ............. G06F 3/04845 |
| 11,079,753 B1 * | 8/2021 | Roy .................... G05D 1/0278 |

(Continued)

FOREIGN PATENT DOCUMENTS

EP    10045616 A1    3/2011

*Primary Examiner* — Christopher J Fibbi
(74) *Attorney, Agent, or Firm* — Snell & Wilmer LLP

(57) ABSTRACT

Methods, systems, devices and apparatuses for a remote control platform. The remote control platform includes a sensor. The sensor is configured to detect one or more objects within a surrounding environment of the vehicle. The remote control platform includes an electronic control unit. The electronic control unit is coupled to the sensor. The electronic control unit is configured to determine an orientation of the vehicle and a route that includes a direction of travel. The electronic control unit is configured to navigate the vehicle along the route based on the one or more objects, the direction of travel and the orientation of the vehicle.

19 Claims, 6 Drawing Sheets

(56) References Cited

U.S. PATENT DOCUMENTS

| | | | |
|---|---|---|---|
| 2007/0067085 A1* | 3/2007 | Lu | B60T 8/24 |
| | | | 340/440 |
| 2009/0278915 A1 | 11/2009 | Kramer et al. | |
| 2010/0052931 A1 | 3/2010 | Kolpasky et al. | |
| 2012/0029731 A1* | 2/2012 | Waldock | G06Q 10/02 |
| | | | 701/2 |
| 2014/0309871 A1 | 10/2014 | Ricci | |
| 2014/0358429 A1* | 12/2014 | Shutko | B60W 30/18036 |
| | | | 701/458 |
| 2017/0158175 A1* | 6/2017 | Fairfield | B60W 60/00276 |
| 2018/0143644 A1* | 5/2018 | Li | B60W 30/18154 |
| 2018/0164817 A1* | 6/2018 | Herz | G05D 1/0088 |
| 2019/0043327 A1* | 2/2019 | Stent | G06T 7/215 |
| 2019/0111921 A1* | 4/2019 | Hehn | G01C 21/30 |
| 2019/0204821 A1 | 7/2019 | Yoon et al. | |
| 2020/0029490 A1* | 1/2020 | Bertucci | G05D 1/0248 |
| 2020/0379471 A1* | 12/2020 | Abendroth | G06V 10/87 |
| 2020/0385008 A1* | 12/2020 | Terechko | B60W 50/023 |

\* cited by examiner

REMOTE CONTROL OF VEHICLE VIA SMARTPHONE AND GESTURE INPUT

BACKGROUND

Field

This disclosure relates to a system, method, apparatus and/or device to remotely control a vehicle via smartphone and/or gesture input.

Description of the Related Art

Vehicle manufacturers are beginning to offer remote-control driving systems that allow the user to control their vehicles. For example, some manufacturers allow the user to control a vehicle to move from a parked location to a user's desired location. These autonomous driving features allow a vehicle to leave a parking space and navigate around obstacles to its owner. In essence, an owner's vehicle may be "summoned" to you from a threshold distance away. These systems, however, may require line of sight and/or may result in near crashes due to their inability to adjust to changes in the environment. Thus, these systems are limited in that the user can only tell the vehicle to arrive or go to a location, and the vehicle determines the optimal path to the desired location. This results in the user relinquishing control of the path that the vehicle travels to the desired location.

Accordingly, there is a need for a system, apparatus and/or method to increase the amount of user remote control of the vehicle to increase the capability of the remote-control function.

SUMMARY

In general, one aspect of the subject matter described in this disclosure may be embodied in a remote control platform for a vehicle. The remote control platform includes a sensor. The sensor is configured to detect one or more objects within a surrounding environment of the vehicle. The remote control platform includes an electronic control unit. The electronic control unit is coupled to the sensor. The electronic control unit is configured to determine an orientation of the vehicle and a route that includes a direction of travel. The electronic control unit is configured to navigate the vehicle along the route based on the one or more objects, the direction of travel and the orientation of the vehicle.

These and other embodiments may optionally include one or more of the following features. The electronic control unit may be configured to determine a current location of the vehicle. The electronic control unit may be configured to categorize the one or more objects within the surrounding environment into a corresponding category of multiple categories. The electronic control unit may be configured to determine a location of each of the one or more objects relative to the vehicle. The electronic control unit may be configured to provide the current location of the vehicle, the corresponding category and the location of each of the one or more objects to a user device to render a graphical representation on the user device.

The electronic control unit may be configured to update the location of each of the one or more objects relative to the vehicle. The electronic control unit may be configured to provide the updated location of each of the one or more objects to track movements of the one or more objects. The graphical representation that is rendered may include one or more icons that represent the current location of the vehicle, the corresponding category and the location of each of the one or more objects. The electronic control unit may be configured to obtain, from a user device, driving instructions. The driving instructions may include the orientation of the vehicle and the route of the vehicle. The electronic control unit may be configured to navigate the vehicle around the one or more objects with the vehicle traveling in the obtained orientation.

The electronic control unit may be configured to obtain, from a user device, driving instructions that include a speed of travel of the vehicle. The electronic control unit may be configured to navigate the vehicle further based on the speed of travel of the vehicle. The electronic control unit may be configured to determine that the one or more objects of the surrounding environment intersect with the route of the vehicle. The electronic control unit may be configured to cancel the navigation of the vehicle along the route of the vehicle. The electronic control unit may be configured to provide a notification that indicates the cancellation of the navigation of the vehicle along the route. The electronic control unit may be configured to provide sensor data of the surrounding environment of the vehicle. The electronic control unit may be configured to provide a suggested alternative route to navigate the vehicle around the one or more objects that intersect with the route of the vehicle.

In another aspect, the subject matter may be embodied in a user device. The user device includes a memory. The memory is configured to store computer-readable instructions that include a software application. The user device includes a processor coupled to the memory. The processor is configured to execute the software application and perform operations to navigate a vehicle. The operations include rendering, on a display, a first location of the vehicle and a first location of each of the one or more objects in proximity to the current location of the vehicle. The operations include obtaining driving instructions including an orientation of the vehicle and a route to navigate the vehicle. The operations include providing the driving instructions to a remote control platform to navigate the vehicle along the route around the one or more objects.

In another aspect, the subject matter may be embodied in a method for navigating an autonomous vehicle. The method includes determining, by a processor, a current location of the vehicle. The method includes detecting, by the processor, one or more objects within a surrounding environment of the current location of the vehicle. The method includes navigating or controlling, by the processor, the vehicle based on a route and an orientation of the vehicle.

BRIEF DESCRIPTION OF THE DRAWINGS

Other systems, methods, features, and advantages of the present invention will be apparent to one skilled in the art upon examination of the following figures and detailed description. Component parts shown in the drawings are not necessarily to scale and may be exaggerated to better illustrate the important features of the present invention.

DETAILED DESCRIPTION

Disclosed herein are systems, apparatuses, and methods to remotely control a vehicle via smartphone and/or gesture input. The remote control system includes a remote control platform and a user device. The remote control platform maps out the locations of the vehicle and one or more objects surrounding the vehicle so that the user can create or generate a route that navigates the vehicle around the one or more objects to the destination. The remote control platform provides the locations of the vehicle and the one or more objects so that the user device may generate a rendering of the environment surrounding the vehicle to allow the user to control the vehicle within the environment in greater detail. The remote control platform provides the user on the user device with greater situational awareness of the environment around the vehicle, which allows the user to provide more detailed driving instructions and more precise control of the vehicle via the user device. For example, user input may specify driving instructions that remotely operate the vehicle to drive 5 feet forward, turn left and then drive another 10 feet to reach the destination location, rather than simply specifying to arrive at a particular destination.

The more detailed driving instructions allow the user to dictate the route that the vehicle navigates around the one or more objects in the surrounding environment. This allows the user to control the exact path that the vehicle travels to the destination from the starting location. Moreover, the user can control other functions of the vehicle, such as the speed, orientation and direction of travel of the vehicle.

Other benefits and advantages include the capability to monitor the objects in the surrounding environment in real-time. For example, some of the objects may be other vehicles, and the remote control platform may identify when these objects move. If these objects are in the path of or move into the path of the vehicle, the remote control platform may disable or cancel navigation of the vehicle to prevent an accident. The remote control platform may also notify the user, suggest an alternative route or allow for manual control.

Additionally, the remote control platform may identify or recognize visual gestures of a user to remotely control the vehicle. The remote control platform may capture gestures of a user and generate driving instructions based on the gestures to navigate the vehicle along a route. This allows a user to control the vehicle via gesture input.

Figure 1:
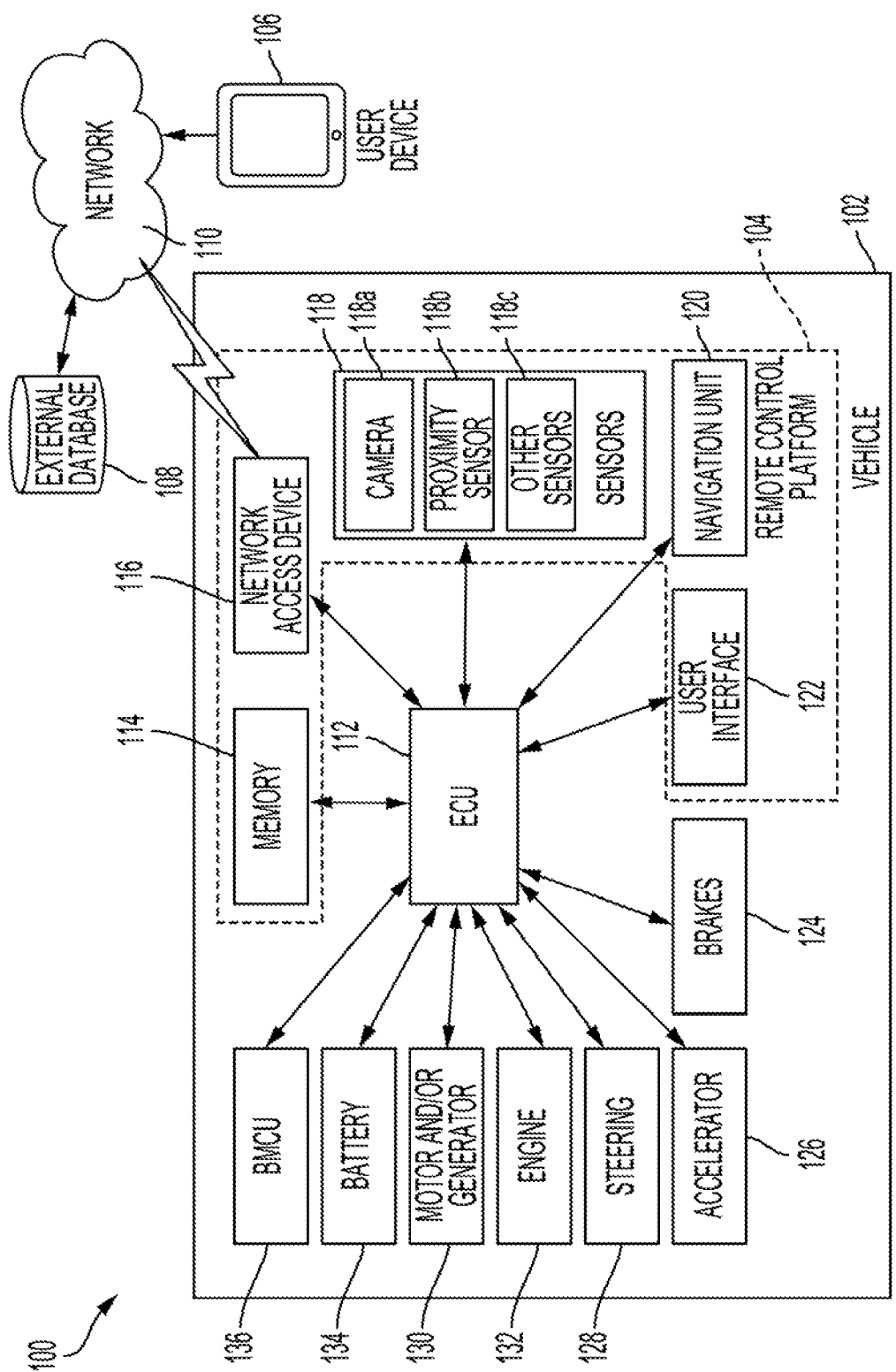
FIG. 1 is a block diagram of an example remote control system according to an aspect of the invention.
Figure 2:
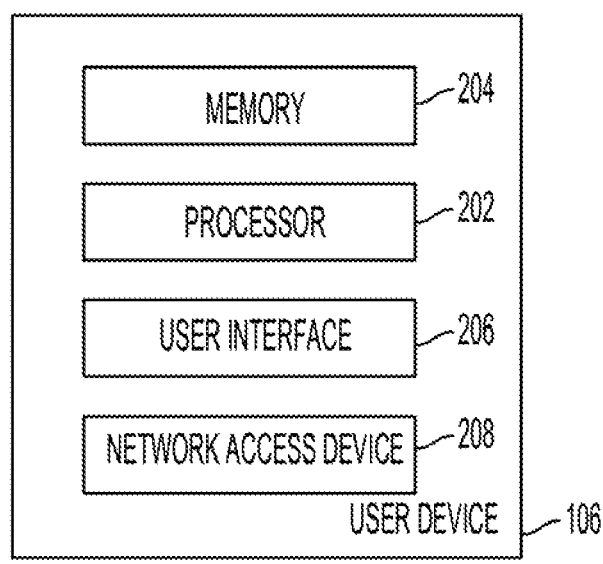
FIG. 2 is a block diagram of an example user device of the remote control system of FIG. 1 according to an aspect of the invention.

FIG. 1 is a block diagram of a remote control system 100. The remote control system 100 may be retro-fitted, coupled to, integrated with, include or be included within a vehicle 102 or may be entirely separate from the vehicle 102. The remote control system 100 may include or be coupled to a remote control platform 104, a user device 106 and/or an external database 108. The user device 106 may be a personal device, a mobile device, such as a smartphone, a tablet or other electronic device that may display notifications, run applications or otherwise interact with the vehicle 102 via a wireless or a wired connection. The remote control system 100 uses the user device 106 to render a graphical representation of the vehicle 102 and the objects surrounding the vehicle 102 and to obtain and map out driving instructions to control the vehicle 102. FIG. 2 is a block diagram of the user device 106.

The remote control system 100 may have or use a network 110 to communicate among different components, such as between the vehicle 102, the user device 106, the remote control platform 104 and/or the external database 108. The network 110 may be a Dedicated Short-Range Communication (DSRC) network, a local area network (LAN), a wide area network (WAN), a cellular network, the Internet, or combination thereof, that connects, couples and/or otherwise communicates among the different components of the remote control system 100.

The remote control system 100 may include or be coupled to the external database 108. A database is any collection of pieces of information that is organized for search and retrieval, such as by a computer, and the database may be organized in tables, schemas, queries, reports, or any other data structures. A database may use any number of database management systems. The external database 108 may include a third-party server or website that stores or provides information. The information may include real-time information, periodically updated information, or user-inputted information. A server may be a computer in a network that is used to provide services, such as accessing files or sharing peripherals, to other computers in the network.

The external database 108 may be a map database that includes the locations of various structures or objects, such as trees, buildings or other objects, which interfere with the route of the vehicle 102. The external database 108 may be a traffic database. The traffic database may include the locations other vehicles and/or track the locations of the other vehicles, such as movements of the other vehicles.

The remote control system 100 includes a remote control platform 104. The remote control platform 104 detects or determines the location of the vehicle 102 and the one or more objects in the surrounding environment in proximity to the vehicle 102, such as within a threshold distance. The remote control platform 104 may detect the movements of the vehicle 102 and the movements of the one or mom objects and provide the locations, movements and types of objects to the user device 106 so that the user device 106 may create or generate a rendering of the environment surrounding the vehicle 102. Moreover, the remote control platform 104 may receive driving instructions from the user device 106 and control or operate the vehicle 102 so that the vehicle 102 avoids obstacles or hazards to arrive at the designated destination. This allows the user to have more control over the navigation, control and/or operation of the vehicle 102 via the user device 106 or through gesture input.

The remote control platform 104 may include an electronic control unit 112, a memory 114, a network access device 116 and/or one or more sensors 118. The remote control platform 104 may include a navigation unit 120 and/or a user interface 122. The remote control platform 104 may include one or more other components of the vehicle 102, such as the brakes 124, the accelerator 126, the steering 128, the motor and/or generator 130, the engine 132, the battery 134, and/or the battery management and control unit (BMCU) 136.

A vehicle 102 is a conveyance capable of transporting a person, an object, or a permanently or temporarily affixed apparatus. The vehicle 102 may be a self-propelled wheeled conveyance, such as a car, a sports utility vehicle, a truck, a bus, a van or other motor, battery or fuel cell driven vehicle. For example, the vehicle 102 may be an electric vehicle, a hybrid vehicle, a hydrogen fuel cell vehicle, a plug-in hybrid vehicle or any other type of vehicle that has a fuel cell stack, a motor and/or a generator. Other examples of vehicles include bicycles, trains, planes, or boats, and any other form of conveyance that is capable of transportation. The vehicle 102 may be semi-autonomous or autonomous. That is, the vehicle 102 may be self-maneuvering and navigate without human input. An autonomous vehicle may have and use one or more sensors and/or a navigation unit to drive autonomously.

The remote control system 100 includes or couples to one or more processors, such as the electronic control unit (ECU) 112 of the remote control platform 104 or the processor 202 of the user device 106. The one or more processors, such as the ECU 112 or the processor 202, may be implemented as a single processor or as multiple processors. For example, the ECU 112 or the processor 202 may be a microprocessor, data processor, microcontroller or other controller, and may be electrically coupled to some or all the other components within the vehicle 102 and/or the remote control system 100. The one or more processors may render a graphical representation of the locations of the vehicle 102 and/or the objects in the surrounding environment. The one or more processors may also obtain and/or navigate driving instructions inputted by the user. The ECU 112 may be coupled to the memory 114, and the processor 202 may be coupled to the memory 204.

The remote control system 100 has a memory 114 within the remote control platform 104 and/or a memory 204 within the user device 106. The memory 114 may be coupled to the ECU 112 and store instructions that the ECU 112 executes, the memory 204 may be coupled to the processor 202 and store instructions that the processor 202 executes. The memory 114 and/or the memory 204 may include one or more of a Random Access Memory (RAM), Read Only Memory (ROM) or other volatile or non-volatile memory. The memory 114, 204 may be a non-transitory memory or a data storage device, such as a hard disk drive, a solid-state disk drive, a hybrid disk drive, or other appropriate data storage, and may further store machine-readable instructions, which may be loaded and executed by the ECU 112 and/or the processor 202. For example, the memory 204 may store a software application that renders a graphical representation of the environment surrounding the vehicle 102 and may be used to access driving instructions that control or operate the vehicle 102.

The user device 106 may include a user interface 206 and/or a network access device 208, and the remote control platform 104 may include a user interface 122 and/or a network access device 116. The one or more user interfaces 122, 206 may receive user input that indicates driving instructions to be used to operate, control or otherwise navigate the vehicle 102. The one or more user interfaces 122, 206 may also receive configuration tolerances that indicate when an object presents a hazard and intersect into the path or the route of the vehicle 102. The one or more user interfaces 122, 206 may also provide notifications and/or a graphical representation of the surrounding environment of the vehicle 102 so that the user can input a route to navigate the vehicle 102 from a starting location to a destination location.

The one or more user interfaces 122, 206 may include an input/output device that receives user input from a user interface element, a button, a dial, a microphone, a keyboard, or a touch screen. The one or more user interfaces 122, 206 may provide an output to an output device, such as a display, a speaker, an audio and/or visual indicator, or a refreshable braille display.

The one or more network access device 116, 208 may include a communication port or channel, such as one or more of a Dedicated Short-Range Communication (DSRC) unit, a Wi-Fi unit, a Bluetooth® unit, a radio frequency identification (RFID) tag or reader, or a cellular network unit for accessing a cellular network (such as 3G, 4G or 5G). The one or more network access device 116, 208 may transmit data to and receive data from the different components of the different entities of the remote control system 100, such as the user device 106, the external database 108 and/or the vehicle 102.

The remote control platform 104 includes a navigation unit 120. The navigation unit 120 may be integral to the vehicle 102 or a separate unit coupled to the vehicle 102. The vehicle 102 may include a Global Positioning System (GPS) unit (not shown) for detecting location data including a current location of the vehicle 102 and date/time information instead of the navigation unit 120. In that regard, the ECU 112 may perform the functions of the navigation unit 120 based on data received from the GPS unit. The navigation unit 120 or the ECU 112 may perform navigation functions. Navigation functions may include, for example, route and route set prediction, providing navigation instructions, and receiving user input such as verification of predicted routes and route sets or destinations.

The remote control platform 104 includes one or more sensors 118. The one or more sensors 118 may include a camera 118a. The camera 118a may capture image data of the surrounding environment, which may be processed or analyzed to recognize structures or objects, such as trees, buildings or other vehicles within the surrounding environment of the vehicle 102 and their relative distances from the vehicle 102. The image data may also be used to determine an orientation of the vehicle 102, such as if the vehicle 102 is facing in the forward or reverse direction. The one or more sensors 118 may include a proximity sensor 118b. The proximity sensor 118b may be use LIDAR, radar or other range-finding technology to detect or determine objects near, such as within a threshold distance, of the vehicle 102. The proximity sensor 118b may also be used to determine the relative distance to those objects. The one or more sensors 118 may include other sensors 118c. The other sensors 118c may include a vehicle speed sensor, which may be used to measure the speed of the vehicle 102, and/or an accelerometer or gyroscope, which may be used to determine the orientation of the vehicle 102. The one or more sensors 118 may also be used to orient the vehicle 102 and to autonomously drive the vehicle 102. For example, the one or more sensors 118 may be used to control the vehicle 102 to navigate along the route included within the driving instructions. The one or more sensors 118 may be used to control the vehicle 102 to navigate around the one or more objects and to maintain the relative distance between the vehicle 102 and the one or more objects as indicated in the driving instructions and/or to otherwise follow the path or route indicated in the driving instructions.

The remote control system 100 may include or be coupled to one or more vehicle components. The remote control system 100 may control the one or more vehicle components to operate or otherwise control the vehicle 102 to move the vehicle 102 from the starting location to the destination location along the route and around the one or more objects in the surrounding environment. The one or more vehicle components may include a motor and/or generator 130. The motor and/or generator 130 may convert electrical energy into mechanical power, such as torque, and may convert mechanical power into electrical energy. The motor and/or generator 130 may be coupled to the battery 134. The motor and/or generator 130 may convert the energy from the battery 134 into mechanical power, and may provide energy back to the battery 134, for example, via regenerative braking. The vehicle 102 may include one or more additional power generation devices such as the engine 132 or a fuel cell stack (not shown). The engine 132 combusts fuel to provide power instead of and/or in addition to the power supplied by the motor and/or generator 130.

The battery 134 may be coupled to the motor and/or generator 130 and may supply electrical energy to and receive electrical energy from the motor and/or generator 130. The battery 134 may include one or more rechargeable batteries and may supply the power to the remote control system 100 even when the vehicle 102 is off.

The BMCU 136 may be coupled to the battery 134 and may control and manage the charging and discharging of the battery 134. The BMCU 136, for example, may measure, using battery sensors, parameters used to determine the state of charge (SOC) of the battery 134. The BMCU 136 may control the battery 134.

The one or more vehicle components may include the brakes 124, the accelerator 126 and/or the steering 128. The remote control platform 104 may control or operate the brakes 124, the accelerator 126 and/or the steering 128 to navigate the vehicle 102 around the surrounding environment along the route. For example, the remote control platform 104 may apply or release the brakes 124 or the accelerator 126 and/or adjust an angle of the steering 128 to decrease the speed, increase the speed and/or change the direction of travel of the vehicle 102.

Figure 3:
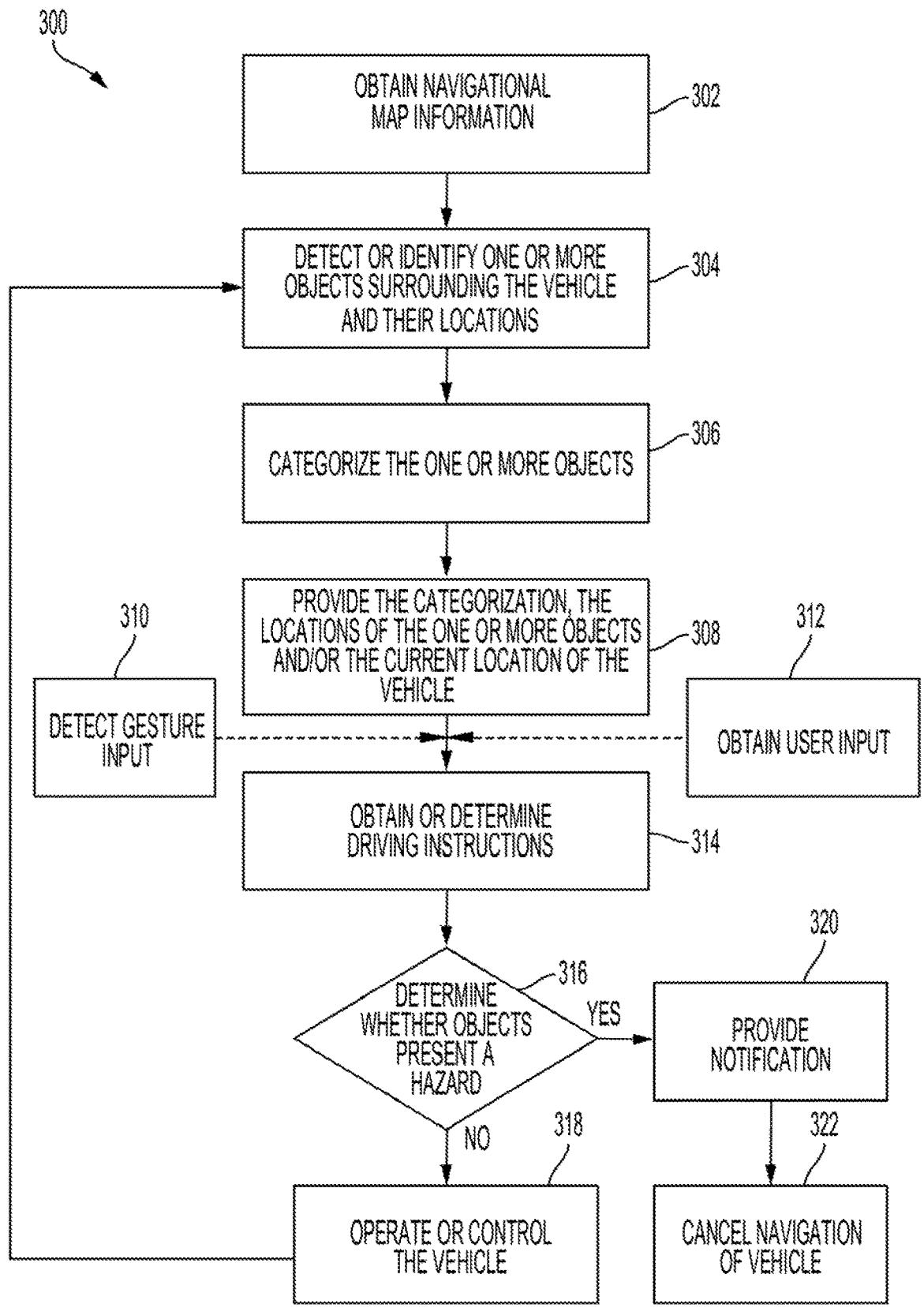
FIG. 3 is a flow diagram of an example process for controlling or operating the vehicle using the remote control platform of the remote control system of FIG. 1 according to an aspect of the invention.

FIG. 3 is a flow diagram of a process 300 for controlling or operating the vehicle 102 using driving instructions. One or more computers or one or more data processing apparatuses, for example, the ECU 112 of the remote control platform 104 of the remote control system 100 of FIG. 1, appropriately programmed, may implement the process 300.

The remote control platform 104 obtains navigational map information (302). The navigational map information may include the current location of the vehicle 102 and/or the locations of one or more objects in the surrounding environment of the vehicle 102. The remote control platform 104 may obtain the navigational map information using the navigation unit 120 and/or the external database 108. For example, the remote control platform 104 may obtain the current location of the vehicle 102 using a global positioning system device and then provide the current the current location of the vehicle 102 to the external database 108. The external database may then provide and the remote control platform 104 may receive the locations of one or more objects in the surrounding environment of the vehicle 102, such as the location of other vehicles, the location of other structures, such as buildings, and/or the location of other objects, such as trees, which have been mapped.

The remote control platform 104 detects or identifies the one or more objects in the surrounding environment of the vehicle 102 (304). The remote control platform 104 may outline or frame each of the one or more objects in the surrounding environment of the vehicle 102. The remote control platform 104 may compare the outline or frame for each of the one or more objects in the surrounding environment of the vehicle 102 to a library of objects and determine whether the object matches one of the library objects. When there is a match, the remote control platform 104 may identify the object in the surrounding environment as the library object, such as a tree, a sign or other vehicle, and recognize the object in the surrounding environment, as such.

Additionally, the remote control platform 104 may use the one or more sensors 118 to determine the location of the one or more objects surrounding the vehicle 102. The location may be a relative location of the one or more objects to the vehicle 102. For example, the remote control platform 104 may use the proximity sensor 118b or analyze the image data from the camera 118a to determine the distance and direction of the one or more objects relative to the vehicle 102. The identification of the object along with the location of the object may be associated with each of the one or more objects.

Once the one or more objects are identified or detected, the remote control platform 104 may categorize the one or more objects in the surrounding environment of the vehicle 102 (306). When the remote control platform 104 matches the one or more objects to a library object, the library object may be associated with a category, such as "building", "tree", "vehicle" or another category, such as "fixed object" or "moving object." The remote control platform 104 may associate the category of the matched library object with that of the object and label or otherwise tag the one or more objects with the label or tag to identify the category of the one or more objects.

The remote control platform 104 provides the categorization of the one or more objects, the location of the vehicle 102 and/or the locations of the one or more objects within the surrounding environment to the user device 106 (308). The remote control platform 104 may send or transmit the categorization of the one or more objects, the location of the vehicle 102 and/or the locations of the one or more objects within the surrounding environment to the user device 106 through the network 110 using the network access device 116. The categorization and/or the locations may be used to generate a rendering of the environment surrounding the vehicle 102 so that the user may use the user device 106 to navigate or control the vehicle 102.

The remote control platform 104 may obtain or detect gesture input (310). The remote control platform 104 may use the one or more sensors 118, such as the camera 118a, to capture the gesture input. For example, the remote control platform 104 may capture image data of the surrounding environment and identify an individual, such as the driver or owner, within a threshold distance of the vehicle 102. Then, the remote control platform 104 may identify within the image data that the user is moving or that a part of the user, such as the hand of the user is moving. The gesture input may be used to determine driving instructions.

The remote control platform 104 may obtain user input (312). The remote control platform 104 may receive the user input from the user device 106. The user input may indicate the driving instructions to navigate or otherwise control the vehicle 102. The user input may be used to determine a speed of travel, a direction of travel, an orientation of the vehicle 102, a starting location of the vehicle 102, a destination location of the vehicle 102 and a route from the starting location to the destination location around the one or more objects within the surrounding environment of the vehicle 102. The user input may also indicate the path of the vehicle 102 relative to the locations of the one or more objects from the starting location to the destination location.

The remote control platform 104 may determine the driving instructions based on the user input provided to the user interface and/or the gesture input (314). The remote control platform 104 may interpret the driving instructions from the user input and/or the gesture input. The remote control platform 104 may determine whether to use the user input and/or the gesture input based on a configuration setting that is set by the user beforehand and/or based on an identity of the driver of the vehicle 102, which may be recognized from captured image data by the one or more cameras 118*a*.

The driving instructions of the vehicle 102 may include a speed of travel, a direction of travel, an orientation of the vehicle 102, a starting location of the vehicle 102, a destination location of the vehicle 102 and a route from the starting location to the destination location around the one or more objects within the surrounding environment of the vehicle 102. The route may include the path of the vehicle 102 relative to the location of the one or more objects.

The remote control platform 104 may use a mapping that associates the received user input from the user device 106 to driving instructions, such as the speed or direction of travel, the orientation of the vehicle 102 and/or the route of the vehicle 102. Similarly, the remote control platform 104 may use a mapping that associates the received gesture input to the driving instructions. The driving instructions may convert to or be associated with particular operations or control of the vehicle 102, such as the operation of the brakes 124, the accelerator 126 and/or the steering 128.

For example, the remote control platform 104 associate a curve in the path indicated in the user input to an angling of the steering 128, which causes the vehicle 102 to turn. The angle of the curve may correspond to the amount of angling of the steering 128. In another example, the remote control platform 104 may associate a straight line that extends a first length and the speed of the dragging of a finger of user on the user device 106 indicated in the user input to the vehicle 102 traveling a first distance in a straight line at a particular speed by applying the accelerator 126 of the vehicle 102. As the user drags their finger faster on the user device 106, the vehicle 102 may accelerate. And as the user drafts their finger farther along in the straight direction, the vehicle 102 travels in the straight path for a longer distance. Similarly, when the user stops their finger on the screen of the user device 106, this may indicate to the remote control platform 104 to apply the brakes 124. The distance between the path of the user's finger on the display on the user device 106 and an icon of an object may directly correspond to the distance between the route of the vehicle 102 and the location of the object in the surrounding environment, and so, the path of the user's finger directly mimics or mirrors the actual path of the vehicle 102 in the surrounding environment. Moreover, the longer the path that is drawn by the user's finger on the display, the longer the straight path that the vehicle 102 travels in the straight path in the surrounding environment.

In another example, the remote control platform 104 may recognize handwaving in a particular direction by the user. The handwaving may indicate the direction that the vehicle 102 is to travel and the speed of the handwaving may indicate the speed that the vehicle 102 is to travel. In another example, the remote control platform 104 may recognize the user holding their hand held up above their head, which may indicate to stop the vehicle 102 from moving.

In some implementations, the user device 106 may receive the user input or gesture input from the user and perform the mapping and/or interpretation of the user input into the driving instructions. The user device 106 may perform the mapping and/or interpretation of the user input into the driving instructions and provide the driving instructions to the remote control platform 104. The mapping, interpretation and/or generation of the driving instructions from the user input and/or the gesture input may be learned or otherwise improved upon using machine learning algorithms.

Once the driving instructions are determined, the remote control platform 104 determines whether the one or more objects present a hazard to the vehicle 102 (316). The one or more objects may present a hazard to the vehicle 102 when the one or more objects intersect or cross into the route of the vehicle 102. The remote control platform 104 may compare the route of the vehicle 102 included within the driving instructions to the locations of the one or more objects, and if the route of the vehicle 102 traverses within a threshold distance of the locations of the one or more objects, the remote control platform 104 may determine that the object presents a hazard to the vehicle 102.

Similarly, the remote control platform 104 may identify that certain objects of the one or more objects are "moving objects" based on the category of the one or more objects and continually and regularly update the locations of the moving objects. The remote control platform 104 may map the path of the one or more moving objects based on the updated locations and determine a trajectory or path of the one or more moving objects. And if the trajectory or the path of the one or more moving objects intersects with the route of the vehicle 102, the remote control platform 104 may determine that the object presents a hazard.

If the one or more objects do not present a hazard to the vehicle 102, the remote control platform 104 operates or controls the vehicle 102 (318). If the one or more objects do present a hazard to the vehicle 102, the remote control platform 104 provides a notification to the user (320) and/or cancels the navigation or control of the vehicle 102 (322).

When the one or more objects do not present a hazard to the vehicle 102, the remote control platform 104 operates or controls the vehicle 102 (318). The remote control platform 104 may operate or control the vehicle 102 based on the driving instructions. The driving instructions, such as an increase in speed, turning, braking or other driving instruction converts to or is associated with an operation of the vehicle 102. The remote control system 100 may engage or disengage the accelerator 126 and/or the brakes 124 to control the amount of speed, acceleration and/or deceleration of the vehicle 102. Moreover, the remote control platform 104 may steer the vehicle 102, such as to turn, using the steering 128. The remote control platform 104 may change gears, such as operate the vehicle 102 in the driving mode, reverse mode or neutral mode. The remote control platform 104 may also change an orientation of the vehicle 102, such as to turn the vehicle 180 degrees to drive the route in reverse while also avoiding the one or more objects. Other operations of the vehicle 102, which may be controlled, include the control of the discharge of the electrical energy from the battery 134 to the motor and/or generator 130 and/or the state of the engine 132 or the throttle to move the wheels of the vehicle 102.

In some implementations, the remote control platform 104 may operate other functionalities of the vehicle 102, such as the windshield wipers, headlights, the windows, the heating, ventilation and air conditioning (HVAC) unit or other functions of the vehicle 102. For example, the remote control platform 104 may turn on the seat warmers or the HVAC unit on a cold day to make the vehicle 102 more comfortable when the vehicle 102 arrives at the destination location of the user.

When the one or more objects do present a hazard to the vehicle 102, the remote control platform 104 provides a notification to the user device 106 (320). The notification may indicate to the user that there is a hazard in the route of the vehicle 102 and request additional driving instructions. The notification may indicate the cancellation of the navigation of the vehicle 102 and/or provide the image data of the surrounding environment to allow the user to navigate around the one or more objects that present a hazard and/or to identify the hazard. The notification may include a suggestion of an alternative route to navigate the vehicle 102 around the one or more objects that present the hazard to the vehicle 102. The alternative route may include sensor data of the relative position or location of the one or more objects to assist the navigation of the vehicle 102 around the one or more objects.

In some implementations, the remote control platform 104 may provide the image data along with the notification to the user device 106. The image data may include live or real-time images of the surrounding environment from the one or more cameras 118a. The remote control platform 104 may provide an option for the user to take manual control over the vehicle 102, which when activated, allows the user to navigate or control the operations of the vehicle 102 manually using the live or real-time images captured by the one or more cameras 118a.

The remote control platform 104 may cancel the navigation of the vehicle 102 when the hazard is detected (322). The remote control platform 104 may override any commands to the one or more vehicle components to operate, move or otherwise control the vehicle 102 to stop the vehicle 102 and/or to shutoff the vehicle 102 to prevent the vehicle 102 from moving. For example, the remote control platform 104 may shutoff the discharge of electrical energy from the battery 134, turn off the engine 132, apply the brakes 124 or otherwise disable operation of the vehicle 102 to prevent the vehicle 102 from moving. The cancellation may be automatic upon detection of the hazard within the route of the vehicle 102.

In some implementations, the remote control platform 104 may receive a user command that automatically cancels the navigation or control of the vehicle 102 regardless of whether there is a hazard that is detected by the one or more sensors 118. For example, the user may simply click on a button (e.g., an emergency or safety stop button) on the display of the user device 106 that causes the remote control platform 104 to turn off, immediately stop or otherwise immobilize the vehicle 102. This advantageously allows the user to stop the vehicle 102 even when there are no hazards present and/or acts as an added safety feature.

Figure 4:
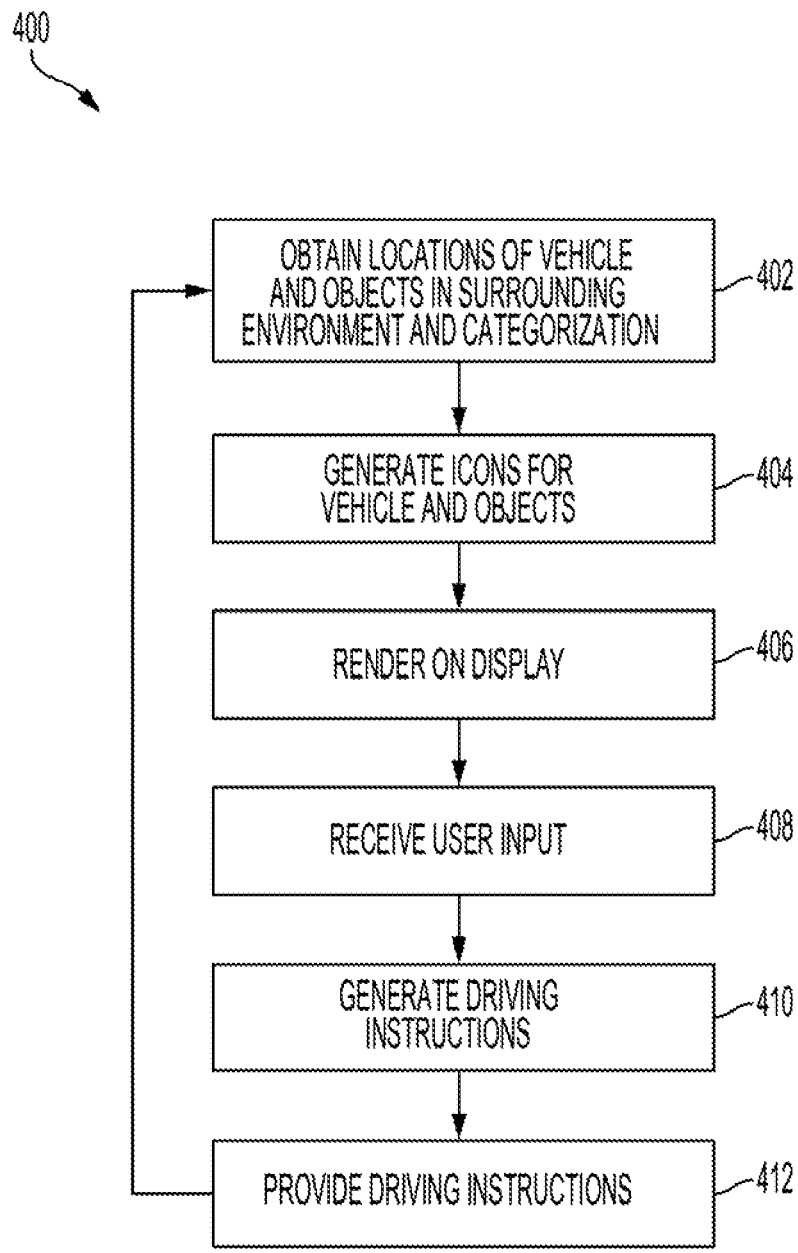
FIG. 4 is a flow diagram of an example process for providing driving instructions to navigate the vehicle using the user device of the remote control system of FIG. 1 according to an aspect of the invention.

FIG. 4 is a flow diagram of a process 400 for providing driving instructions to navigate the vehicle 102. One or more computers or one or more data processing apparatuses, for example, the processor 202 of the user device 106 of the remote control system 100 of FIG. 1, appropriately programmed, may implement the process 400.

The user device 106 obtains the one or more locations of the vehicle 102 and/or the objects in the surrounding environment and the categorization of the one or more objects (402). The user device 106 may obtain the one or more locations of the vehicle 102 and/or the objects along with the categorization of the one or more objects from the remote control platform 104 and use this information to generate a rendering of the environment on the user interface 206, such as a display, of the user device 106.

The user device 106 generates icons for the vehicle 102 and the one or more objects (404). The generation of the icons may be based on the corresponding category of the one or more objects. For example, a tree icon 602 may be generated to represent a tree, another vehicle icon 604 may be generated to represent other vehicles, and a vehicle icon 606 may be generated to represent the user's own vehicle. The user device 106 may use a variety of other icons to represent different structures or other objects one may encounter in the environment surrounding the vehicle 102.

Once the icons are generated, the user device 106 may render the icons on the display of the user device 106 (406). The distance, direction and location of the icons of the one or more objects relative to the icon of the vehicle 102 may mirror or mimic the actual distance, direction and location of the one or more objects relative to the vehicle 102 such that even the distance apart between the icons corresponds to or is correlated with the distance apart between the one or mom objects and the vehicle 102. This recreates an accurate rendering of the environment surrounding the vehicle 102.

Figure 5:
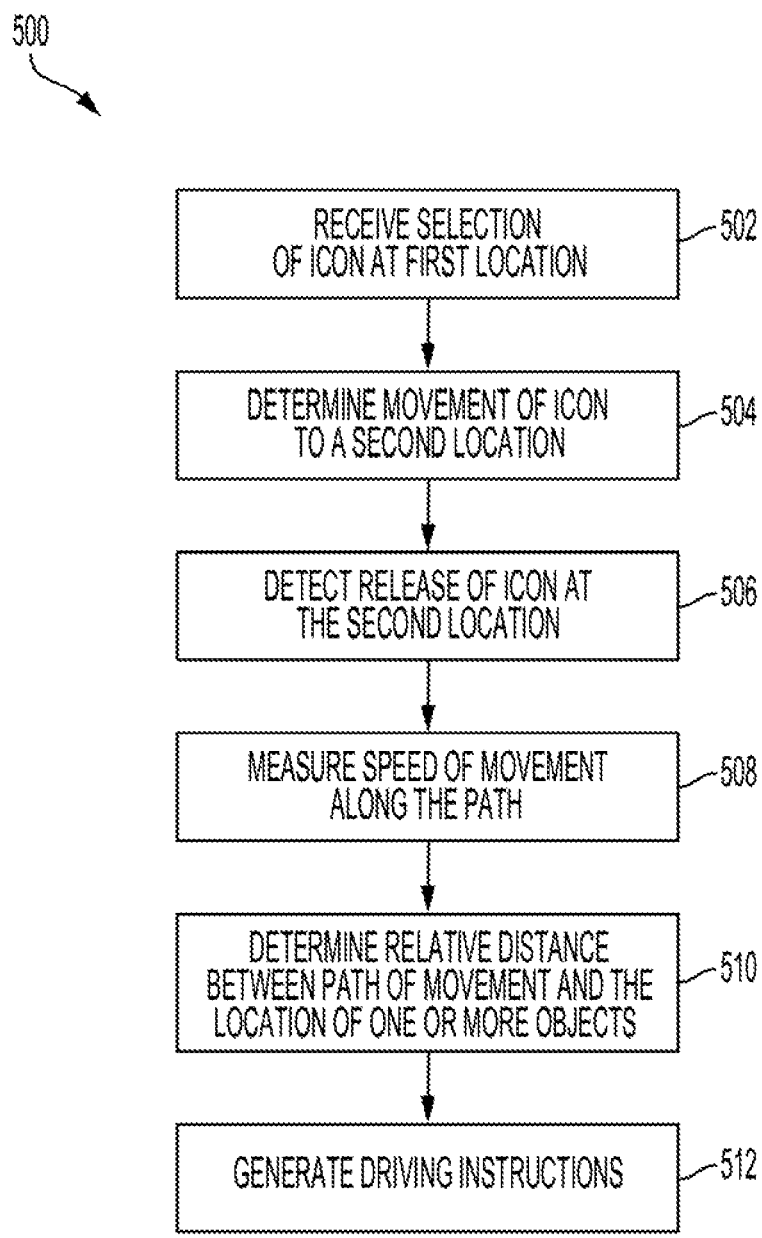
FIG. 5 is a flow diagram of an example process for generating the driving instructions to navigate the vehicle using the user device of the remote control system of FIG. 1 according to an aspect of the invention.

The user device may receive user input, such as a tap, a selection, a swipe or other user contact with the user interface 206 (408). The user input may correspond to driving instructions to control the vehicle 102. The user device 106 may receive the user input via the user interface 206, such as via a touch-screen display. Once the user input is received, the user device 106 may generate the driving instructions based on the user input (410). In some implementations, the remote control platform 104 may translate the user input into the driving instructions. FIG. 5 further describes the process 500 for associating user input with driving instructions.

The user device 106 may provide the driving instructions to the remote control platform 104 (412). The user device 106 may use the network access device 208 to send the driving instructions to the remote control platform 104 to allow the remote control platform to operate or control the one or more vehicle components to operate the vehicle 102. The network access device 116 may send the driving instructions via the network 110.

FIG. 5 is a flow diagram of a process 500 for generating the driving instructions to navigate the vehicle 102. One or more computers or one or more data processing apparatuses, for example, the processor 202 of the user device 106 of the remote control system 100 of FIG. 1, appropriately programmed, may implement the process 500.

Figure 6:
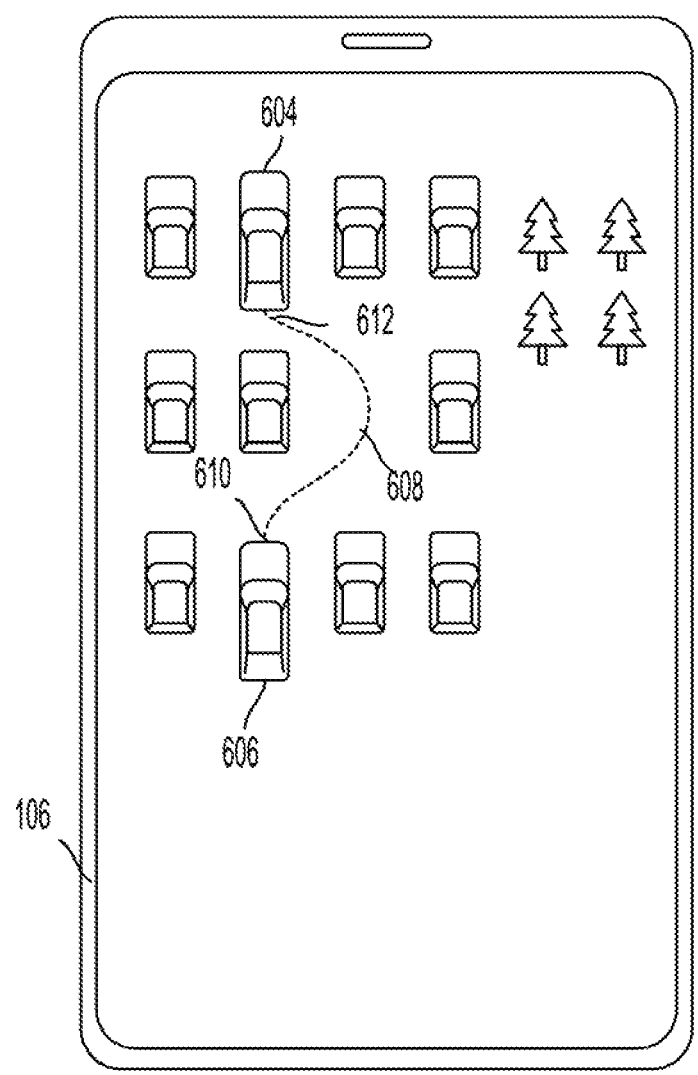
FIG. 6 shows an example graphical representation of the vehicle and the surrounding environment around the vehicle on the user device of the remote control system of FIG. 1 according to an aspect of the invention.

The user device 106 may receive the selection of an icon, such as the vehicle icon 606, at a first location 610 (502). The selection may be of the vehicle icon 606, as shown in FIG. 6 for example, and may indicate that the user intends to generate driving instructions for the vehicle 102. The selection may occur when the user device 106 detects when pressure is applied to the display at the first location 610, for example.

The vehicle icon 606 may be at a first location 610 on the display of the user device 106 surrounded by other icons, such as the other vehicle icon 604 and/or the tree icon 602. The other icons may be positioned on the display in a position or location relative to the first location 610 that represents the starting location of the vehicle 102. The first location 610 may be a starting location or a current location of the vehicle 102. The starting location may be the beginning of the route of the vehicle 102.

The selection of the icon may also indicate the orientation of the vehicle 102. For example, when the user selects the vehicle icon 606, the vehicle icon 606 may switch between different orientations of the vehicle 102 in which the vehicle 102 will travel, such as in a forward direction resulting in the vehicle 102 driving forward, or a rearward direction resulting in the vehicle 102 driving in reverse.

The user device 106 may obtain the movement of the icon to a second location (504). The user device 106 may receive user input that indicates that the user is dragging, sliding or otherwise moving the vehicle icon 606 from the first location 610 to a second location 612. The dragging, sliding or otherwise moving of the vehicle icon 606 may indicate the route to navigate the vehicle 102 around the one or more objects, such as the other vehicles represented by the other vehicle icon 604. The dragging, sliding or otherwise moving of the vehicle icon 606 around the one or more other icons, such as the other vehicle icon 604 and/or the tree icon 602, may be represented by the path 608 on the display on the user interface 206. The distance between the path 608 and the other vehicle icon 604 or tree icon 602 may correspond to the distance that the vehicle 102 maintains from the other vehicle represented by the other vehicle icon 604 or tree represented by the tree icon 602.

The user device 106 may detect a release of the icon at the second location 612 (506). The second location 612 may be a destination location and the release of the icon may represent the end of the route at the destination location. The user device 106 may detect the release of the icon when pressure is released from the display at the second location 612, for example. The release of the icon may trigger the generation of the driving instructions based on the user input sequence of the selection, dragging and subsequent release of pressure on the user interface 206.

Once the user device 106 detects the release of the icon, the user device 106 may calculate or measure the speed of the movement along the path 608 from the first location 610 to the second location 612 (508). The calculated or measured speed of the movement of the user input may correspond to and indicate the speed that vehicle 102 is to travel on the route. The measured speed may be directly proportional to the speed that the vehicle 102 is to travel on the route around the one or more objects. As the movement speed of the pressure applied on the user device 106 increases, the speed that the vehicle 102 may increase, and as the movement of speed of the pressure applied on the user device 106 decreases, the speed that the vehicle 102 travels may also decrease.

The user device 106 may determine the relative distance between the path 608 of movement of the vehicle icon 606 and the other icons (510). The user device 106 may calculate the relative distance between the path 608 and the location of the other icons. The relative distance may correspond to relative distances that the vehicle 102 is to maintain with respect to the one or more objects.

The user device 106 generates the driving instructions (512). The user device 106 generates the driving instructions based on the determined relative distance between the path 608 and the other icons, the measured speed of the movement along the path 608, the user input that indicates the selection of the icon at the first location 610 and the release of the icon at the second location 612. The user device 106 may correspond the first location 610 to the start location of the vehicle 102, the second location 612 to the destination location of the vehicle 102, the path 608 with the route, the measured speed of the movement along the path 608 to the speed of the vehicle, and the relative distances between the path 608 and the other icons as the relative distance between the route of the vehicle 102 and the locations of the one or more objects. These driving instructions are then provided to the remote control platform 104 to operate or control the vehicle 102.

Exemplary embodiments of the invention have been disclosed in an illustrative style. Accordingly, the terminology employed throughout should be read in a non-limiting manner. Although minor modifications to the teachings herein will occur to those well versed in the art, it shall be understood that what is intended to be circumscribed within the scope of the patent warranted hereon are all such embodiments that reasonably fall within the scope of the advancement to the art hereby contributed, and that that scope shall not be restricted, except in light of the appended claims and their equivalents.

What is claimed is:

1. A remote control platform for a vehicle, comprising:
a sensor configured to detect sensor data related to one or more objects within a prescribed surrounding environment of the vehicle; and
a processor coupled to the sensor and configured to:
receive, from a user device wirelessly connected to the processor, user input data corresponding to a route between a current location of the vehicle and an end location within the prescribed surrounding environment, the user input data including a measurement of a speed at which an icon was dragged on the user device to create the route,
determine a vehicle speed at which the vehicle is to travel on the route based on the measurement being proportional to the vehicle speed,
determine a mobility status of each of the one or more objects within the prescribed surrounding environment of the vehicle based on the sensor data,
determine that the vehicle traveling on the route is predicted to run into at least one object of the one or more objects at a future time at a location on the route based on the mobility status of the at least one object indicating that the at least one object is traveling towards the location,
provide, via the user device, an output including:
real-time image data of the prescribed surrounding environment of the vehicle based on the sensor data, and
a request for user input of a plurality of navigation instructions regarding how to navigate the vehicle based on the real-time image data,
receive the user input via the user device, and
navigate the vehicle at the vehicle speed based on the plurality of navigation instructions included in the user input such that the vehicle avoids the at least one object.

2. The remote control platform of claim 1, wherein the processor is further configured to:
determine the current location of the vehicle;
categorize each of the one or more objects within the prescribed surrounding environment of the vehicle into a corresponding category of a plurality of predetermined categories of objects;
determine a location of each of the one or more objects relative to the vehicle; and
provide the current location of the vehicle and the corresponding category and the location of each of the one or more objects to the user device to render a graphical representation on the user device.

3. The remote control platform of claim 2, wherein the processor is further configured to:

update the location of each of the one or more objects relative to the vehicle; and
provide the updated location of each of the one or more objects relative to the vehicle to track movements of the one or more objects.

4. The remote control platform of claim 2, wherein the graphical representation that is rendered includes one or more icons that represent the current location of the vehicle and the corresponding category and the location of each of the one or more objects.

5. The remote control platform of claim 1, wherein the plurality of navigation instructions include an orientation of the vehicle; and
wherein to navigate the vehicle based on the plurality of navigation instructions, the processor is configured to navigate the vehicle around the at least one object with the vehicle traveling in the received orientation.

6. The remote control platform of claim 1, wherein the processor is further configured to:
cancel the traveling of the vehicle on the route based on h determination that the vehicle traveling on the route is predicted to run into the at least one object.

7. The remote control platform of claim 6, wherein the processor is further configured to:
provide a notification that indicates the cancellation of the traveling of the vehicle on the route; and
provide a suggested alternative route to navigate the vehicle around the at least one object.

8. The remote control platform of claim 1, further comprising:
a second sensor coupled to the processor and configured to detect gesture input;
wherein the processor is further configured to navigate the vehicle further based on the gesture input.

9. The remote control platform of claim 8, wherein the gesture input includes a plurality of hand motions that indicate a plurality of additional driving instructions that include a direction of travel and a speed of travel.

10. A user device, comprising:
a memory configured to store a plurality of computer-readable instructions that include a software application; and
a processor coupled to the memory and configured to execute the software application to perform a plurality of operations to navigate a vehicle, the plurality of operations including:
providing first data to a remote control platform for the vehicle, the first data including:
a route to navigate the vehicle autonomously, and
a vehicle speed at which to navigate the vehicle autonomously, the vehicle speed being proportional to a measurement of a speed at which an icon was dragged on a display to create the route, the display being coupled to the processor,
receiving second data indicating that the vehicle traveling autonomously on the route came to a controlled stop in response to determining that at least one object of a plurality of objects within a prescribed surrounding environment of the vehicle presents a hazard on the route,
providing, via the display, an output including:
real-time image data of the prescribed surrounding environment of the vehicle, and
a request for user input of a plurality of manual navigation instructions by a user to manually control the vehicle based on the real-time image data,
receiving the user input via an input device coupled to the processor, and
providing third data including the plurality of manual navigation instructions to the remote control platform such that the user manually controls the vehicle around the at least one object.

11. The user device of claim 10, wherein the plurality of operations further include:
determining a current location of the vehicle;
determining a location of each of one or more objects within a threshold distance from the current location of the vehicle; and
determining a category for each of the one or more objects.

12. The user device of claim 11, wherein the plurality of operations further include:
generating an icon for the vehicle and an icon for each of the one or more objects based on the category for each of the one or more objects; and
rendering, on the display and using the generated icons, the current location of the vehicle and the location of each of the one or more objects.

13. The user device of claim 10, wherein providing the first data including the route includes:
receiving first user input that indicates a starting location of the route, an ending location of the route, and a path between the starting location and the ending location; and
receiving second user input that indicates an orientation of the vehicle.

14. The user device of claim 10, wherein the plurality of operations further include:
rendering, on the display, a first location of the vehicle and a first location of each of one or more objects within a threshold distance from a current location of the vehicle;
receiving data including a second location of the vehicle and a second location of each of the one or more objects, wherein the first location of the vehicle is different than the second location of the vehicle; and
rendering, on the display, the second location of the vehicle and the second location of each of the one or more objects in place of, respectively, the first location of the vehicle and the first location of each of the one or more objects.

15. The user device of claim 14, wherein a change between the second location of the vehicle and the first location of the vehicle corresponds to movement of the vehicle, wherein a change between the second location of a corresponding object of the one or more objects and the first location of the corresponding object of the one or more objects corresponds to movement of the corresponding object.

16. A method for navigating a vehicle, comprising:
receiving, by a processor and from a user device wirelessly connected to the processor, data corresponding to a route for the vehicle to travel autonomously and a measurement of a speed at which an icon was dragged on the user device to create the route;
determining, by the processor, a vehicle speed at which the vehicle is to travel autonomously based on the measurement being proportional to the vehicle speed:
detecting, via a sensor coupled to the processor, sensor data related to one or more objects within a prescribed surrounding environment of the vehicle;

determining, by the processor, a mobility status of each of the one or more objects within the prescribed surrounding environment of the vehicle based on the sensor data;

determining, by the processor, that the vehicle traveling autonomously on the route is predicted to run into at least one object of the one or more objects at a future time at a location on the route based on the mobility status of the at least one object;

providing, via the user device, an output including:
real-time image data of the prescribed surrounding environment of the vehicle, and
a request for user input of a plurality of navigation instructions regarding how to navigate the vehicle based on the real-time image data;

detecting, via an image sensor coupled to the processor, user motion data including a plurality of mid-air motions of a user indicative of the plurality of navigation instructions; and navigating or controlling, by the processor, the vehicle based on the detected user motion data such that the vehicle avoids the at least one object.

17. The method of claim 16, further comprising:
determining, by the processor, a current location of the vehicle;
determining, by the processor, a location for each of the one or more objects;
rendering, on the user device, the location for each of the one or more objects and the current location of the vehicle; and
rendering, on the user device, an updated location for each of the one or more objects and an updated current location of the vehicle as the vehicle navigates based on the detected user motion data.

18. The method of claim 16, wherein detecting the user motion data includes detecting a plurality of mid-air hand motions of the user.

19. The method of claim 16, wherein:
receiving the data corresponding to the route for the vehicle to travel autonomously includes receiving user input that indicates the route including a starting location, an ending location, and a path between the starting location and the ending location.

\* \* \* \* \*